United States Patent

Harms et al.

Patent Number: 5,631,411
Date of Patent: May 20, 1997

[54] METHOD AND APPARATUS FOR ENGINE MONITORING

[75] Inventors: Klaus C. Harms; Hans-Michael Koegeler; Wilhelm Kunzfeld; Herbert Schiffbaenker, all of Graz, Austria

[73] Assignee: AVL Gesellschaft fuer Verbrennungskraftmaschinen und Messtechnik m.b.H. Prof. Dr. Dr. h.c. Hans List, Graz, Austria

[21] Appl. No.: 567,067

[22] Filed: Dec. 4, 1995

Related U.S. Application Data

[63] Continuation of Ser. No. 175,428, filed as PCT/AT93/00067, Apr. 21, 1993, published as WO93/22648, Nov. 11, 1993, abandoned.

[30] Foreign Application Priority Data

Apr. 30, 1992 [AT] Austria ............... 895/92

[51] Int. Cl.$^6$ .................................. G01M 15/00
[52] U.S. Cl. ..................................... 73/117.3
[58] Field of Search ............... 73/35.03, 35.04, 73/116, 117.3, 862.192; 123/419, 436; 364/431.07, 431.08

[56] References Cited

U.S. PATENT DOCUMENTS

| | | | |
|---|---|---|---|
| 3,729,989 | 5/1973 | Little | 73/862.192 |
| 3,817,092 | 6/1974 | Ludloff | 73/862.192 |
| 3,921,446 | 11/1975 | Ludloff | 73/862.192 |
| 4,332,162 | 6/1982 | Garthe | 73/117.3 |
| 4,501,138 | 2/1985 | McCandless | 73/116 |
| 4,691,288 | 9/1987 | Kay et al. | 73/862.192 |
| 5,044,195 | 9/1991 | James et al. | 73/117.3 |
| 5,067,355 | 11/1991 | Witte | 73/117.3 |
| 5,095,742 | 3/1992 | James et al. | 73/116 |
| 5,157,965 | 10/1992 | Koegeler et al. | |

Primary Examiner—Richard Chilcot
Assistant Examiner—Eric S. McCall
Attorney, Agent, or Firm—Hill, Steadman & Simpson

[57] ABSTRACT

The invention presented herein makes it possible to construct and operate an engine monitoring apparatus that calculates the engine speed, the engine load and/or engine monitoring quantities basically only from the measurement of an angular velocity curve at the gear rim of an internal combustion engine (optionally, from a plurality of angular velocity curves). The basis is thus simultaneously created for monitoring all other measured quantities within narrow limits that are dependent on load and speed. The invention can also be utilized for control purposes or for measuring power.

24 Claims, 9 Drawing Sheets

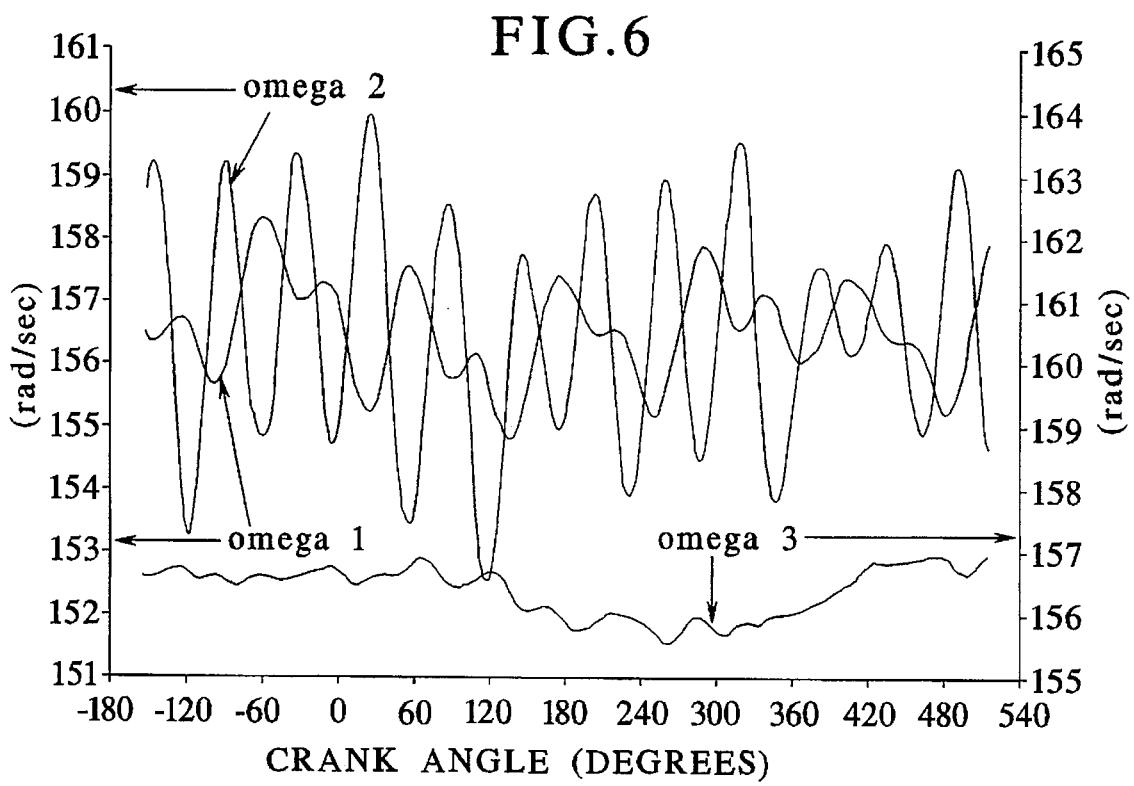
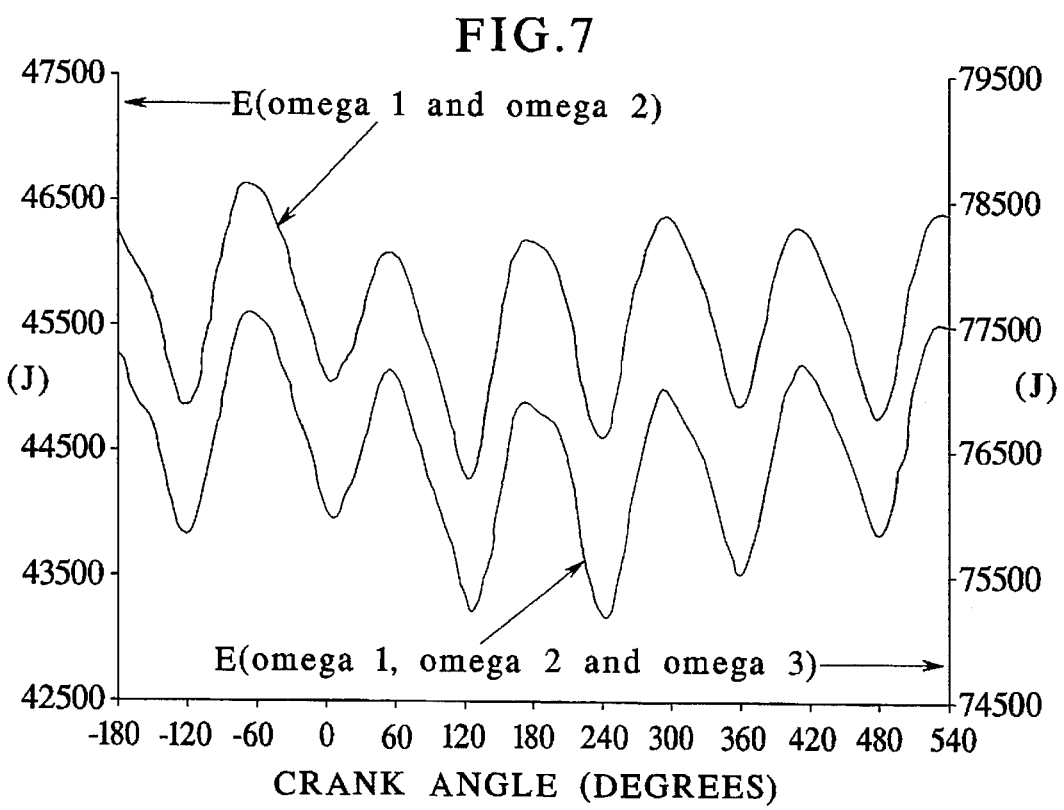

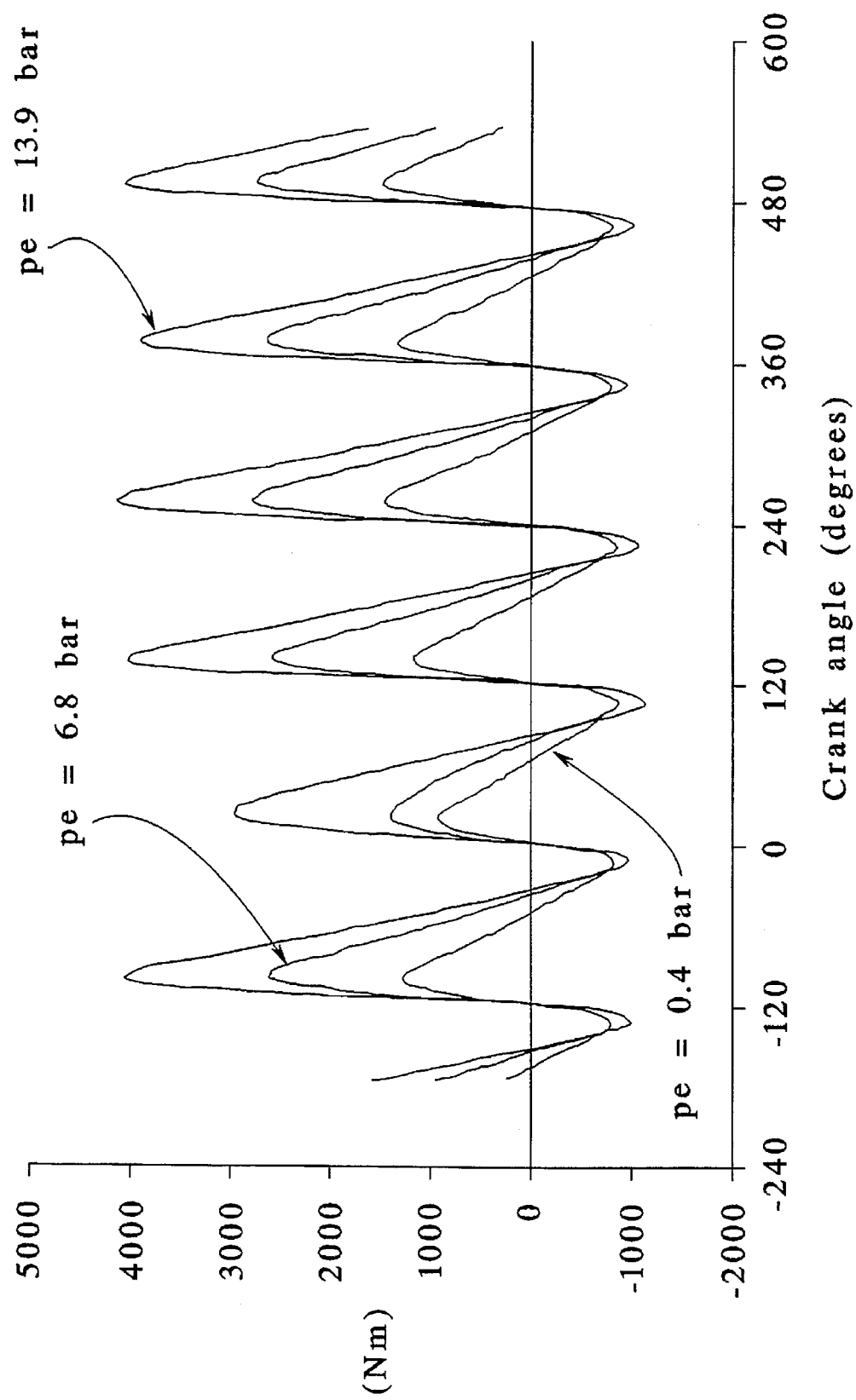

METHOD AND APPARATUS FOR ENGINE MONITORING

This is a continuation of application Ser. No. 08/175,428, filed as PCT/AT93/00067 Apr. 21, 1993 and published as WO93/22648 Nov. 11, 1993, now abandoned.

FIELD OF THE INVENTION

The invention is directed to a method for monitoring internal combustion engines, particularly multi-cylinder internal combustion engines, whereby measurements of the rotational angle speed that is dependent on the crank angle are continuously implemented and dimensional quantities for RPM and torque or, respectively, load are identified by the evaluation thereof. The invention is also directed to an apparatus for checking internal combustion engines, comprising a measuring instrument for identifying the rotational angle speed that is dependent on the crank angle and having an evaluation unit in communication therewith for calculating dimensional quantities for RPM and torque or, respectively, load.

PRIOR ART

Torque ("load") and RPM represent fundamental measured quantities in the operation of internal combustion engines. Most other quantities that are measured at engines exhibit dependencies both on the engine load as well as on the engine speed. These relationships are usually presented in fields of characteristics in engine research. Points in time of ignition, for example, are also programmed in engine management systems dependent on speed and load. In engine monitoring tasks at present, by contrast, a load measurement is usually foregone (because of the technical and financial outlay) and only absolute limit values, for example for oil pressure, coolant temperature or exhaust gas temperatures, are monitored.

Whereas the engine speed can always be simply measured in many different ways, measuring the torque output by the engine represents an incommensurately higher outlay. Finally, wire strain gauges are attached to shaft sections that are loaded to a specifically high degree in order to acquire the deformations as a consequence of the torsion. This method represents a direct involvement in the drive train but has high precision. Further, differential angle measurements are also implemented via soft drive train elements. The reaction torque in the engine suspensions has also been utilized for identifying the torque.

All of these methods involve high outlay for measuring instruments and sensors. There have therefore already been attempts to acquire load dimensions from the speed that can be relatively simply measured, i.e. the average angular speed, and the average angular acceleration. For example, the load moment in U.S. Pat. No. 3,921,446 (Karl Ludloff) is estimated by combining an acceleration and a run-out phase on the basis of a specific angular speed.

It is also known that an average load moment of a piston engine can be fundamentally identified as well from the curve of the momentary angular acceleration of the crank shaft. Harry J. Venema thus points out in U.S. Pat. No. 4,550,595 for the four cylinder four-cycle engine that the engine load can only be reconstructed from the course of the angular speed and angular acceleration of the crank shaft when the effect of the force of inertia of the oscillating masses is also taken into consideration in the evaluation. An approximation equation apparatus is then specifically recited in the Letters Patent for the four cylinder four-cycle engine.

A lack of taking the forces of inertia into consideration also limits the employability of the method of S. J. Citron, EP 0198137. The load dimension recited therein corresponds to an amplitude of the curve of the angular speed and exhibits an in expediently great dependency on RPM. Over and above this, it has been found in tests that the amplitude of the curve of the angular speed at high speeds can also decrease with increasing load and thus does not have a monotonous course. A monotonous relationship, however, is a prerequisite for the utility of a measured quantity.

W. B. Ribbens and G. Rizzoni present an electrical equivalent model in SAE Paper 8900885 with which it is possible to reconstruct the average, internal engine torque from the measured curve of the angular speed and from the measured curve of the angular acceleration. This average, internal engine torque differs from the load moment only due to the engine friction. What is disadvantageous about this method is the great number of model parameters required, the great calculating outlay, and the fact that the influence of crank shaft torsional oscillations cannot be taken into consideration.

SUMMARY OF THE INVENTION

An object of the invention is to avoid the disadvantages which have been addressed with respect to known methods and apparatus and, in particular, to create a possibility of identifying the engine load in a simple way and with few engine data.

In a method of the species initially cited, this is inventively achieved in that the fluctuations in the energy level curve that can be calculated from the curve of the rotational angle speed are utilized as dimensional quantity for torque or, respectively, load. The corresponding fashioning of the apparatus of the invention is characterized in that the evaluation unit comprises a means for calculating the energy level curve as well as a means connected thereto for identifying fluctuations in the energy level curve and allocating these to the sought dimensional quantities for torque or, respectively, load.

It is thus possible to calculate the engine speed and the engine load or, respectively, various other engine monitoring characteristics in a simple way solely from the measurement of the momentary crank shaft rotational speed as a function of the crank angle itself—even without identifying the angular acceleration.

In addition, AT-B 393,324 (U.S. Pat. No. 5,157,965) is also referenced here with respect to the terms "energy level" or, respectively, "energy level curve" which are set forth in greater detail below, the bases for these quantities or, respectively, their calculation being explicitly presented therein.

BRIEF DESCRIPTION OF THE DRAWINGS

FIG. 6 is a graphic illustration of three separate angular speeds versus crank angle.

FIG. 7 is a graphic illustration of two separate energy levels versus crank angle, calculated from two or three angular velocities respectively.

FIG. 8 is a graphic illustration of three separate load conditions versus crank angle.

DETAILED DESCRIPTION OF THE PREFERRED EMBODIMENTS

Figure 1:
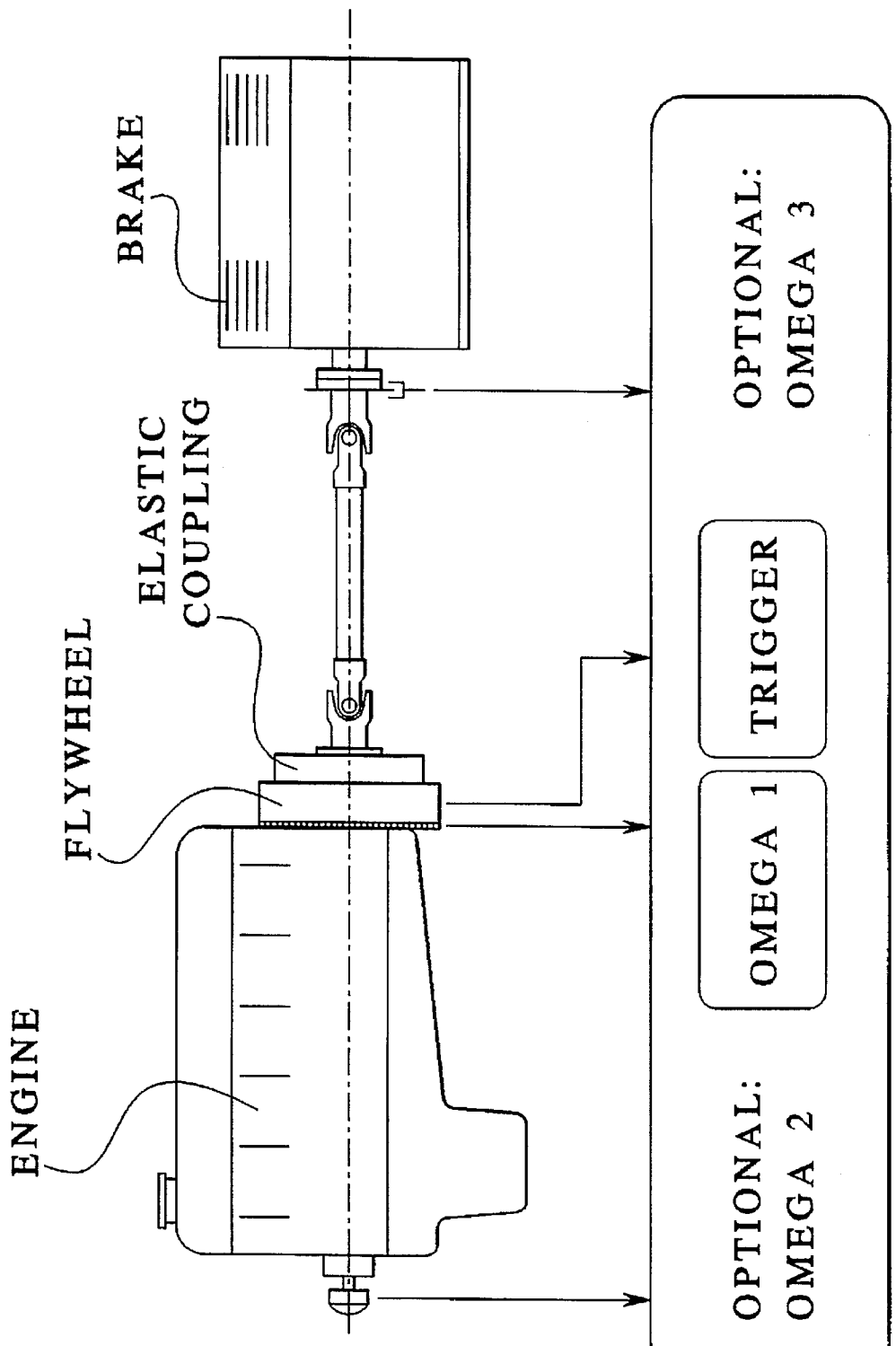
FIG. 1 is a schematic illustration of an exemplary measuring arrangement in accordance with the principles of the present invention.

FIG. 1 shows a typical measuring instrument. The momentary rotational angle speed $\omega_1$ is measured at the flywheel of the engine. A trigger quantity T that allocates a point in time in the curve of $\omega_1$ to a specific crank shaft position can likewise be taken, for example, at the flywheel. Optionally, further rotational angle speeds can be measured, for example $\omega_2$ and $\omega_3$ in order to also be able to take torsional oscillations of the crank shaft into consideration.

Given knowledge of load and speed, all further measured engine quantities can then be observed in a field of characteristics, for example in an engine monitoring device.

Figure 2:
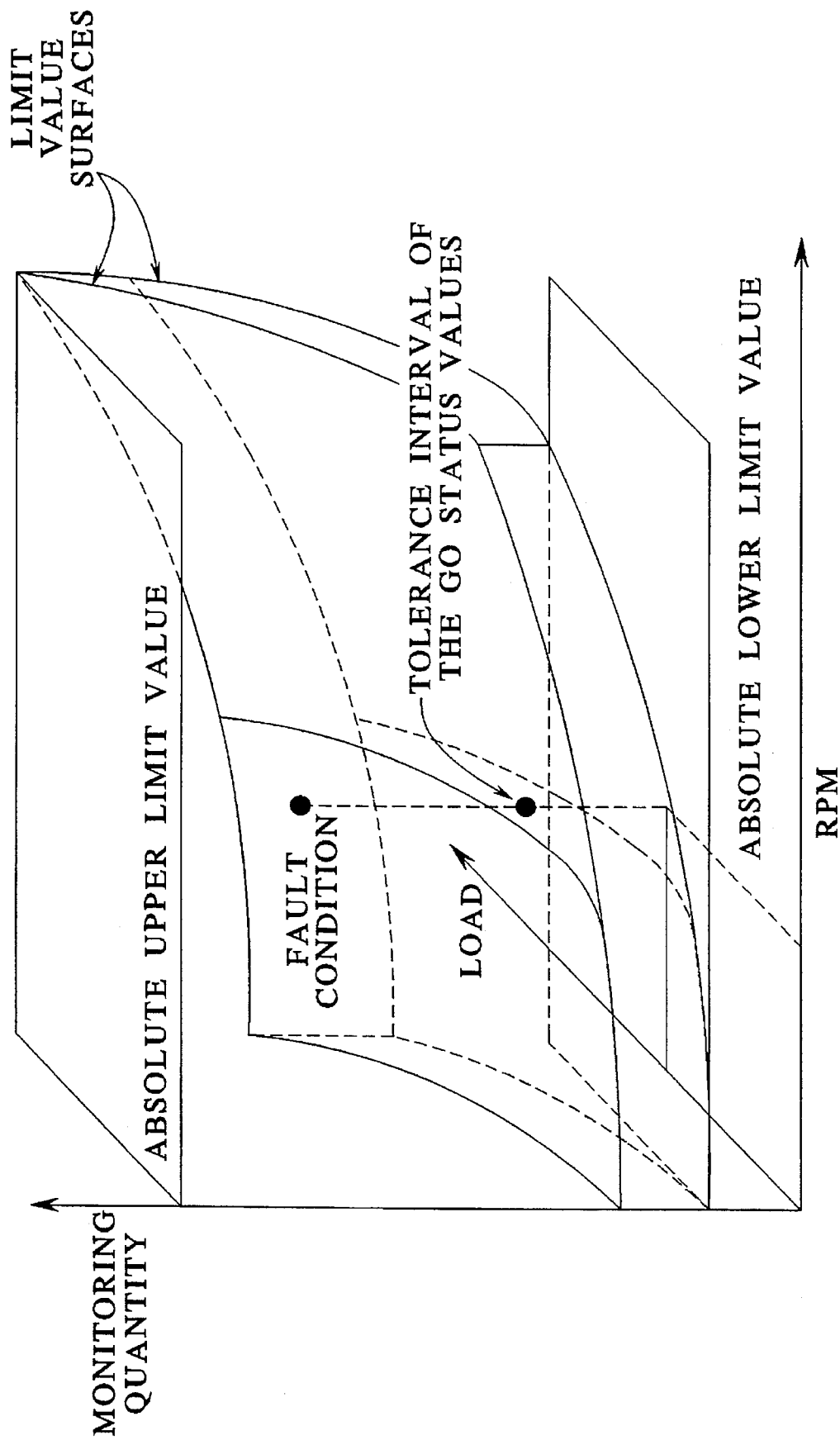
FIG. 2 is a graphic illustration of monitoring quantity versus RPM and load.

It is thus possible to not only specify individual limit values with a necessarily great range of tolerances for separating go and no-go conditions but to also indicate "limit value surfaces" (see FIG. 2). This means that the various measured quantities for monitoring such as, for example, measured quantities, loading pressure, exhaust temperatures, oil pressure, quantities from the curve of the oil pressure, coolant temperature, injection or, respectively, ignition times, smoke value or operating hours; or, respectively, characteristics as well that can be likewise identified from the measured $\omega$-curve, and much more can be monitored in substantially narrower tolerance limits than when specifying a respectively upper and lower limit value for the entire operating range. In brief: the influence of engine damage on a specific measured quantity can be separated from that of the operating condition. Of course, the possibility of identifying performance also derives from the knowledge of speed and load, namely not only for an acceleration or run-out phase but also in the stationary condition.

For identifying the momentary rotational angle speed of the crank shaft, the crank shaft position $\alpha$ is measured at at least one component part of the drive train as a function of the time t and the angular speed $\omega$ is calculated therefrom in its dependency on $\alpha$:

$$\omega(\alpha) = \frac{\Delta \alpha}{\Delta t(\alpha)} \qquad \text{(Equation 1)}$$

For generating the angular mark signals, either existing marks—such as, for example, the teeth of the gear rim—are sensed in a suitable form and processed and/or other, well-known incremental measuring methods are utilized. $\Delta\alpha$ thereby typically lies between 1° and 6° crank angle, dependent on the plurality of available marks. A separate trigger mark —preferably 1* per cycle—allows an exact angle allocation of the angular velocity curve. Many possibilities are well-known in order to obtain this trigger information: thus, for example, an exactly revolution-synchronous mark at the flywheel and a further signal can be combined that in fact varies somewhat in terms of the exact angular references but enables a cylinder allocation for the four-cycle engine, for example an ignition voltage signal or an injection line pressure signal. The latter signal can be eliminated for the two-cycle engine.

Figure 3:
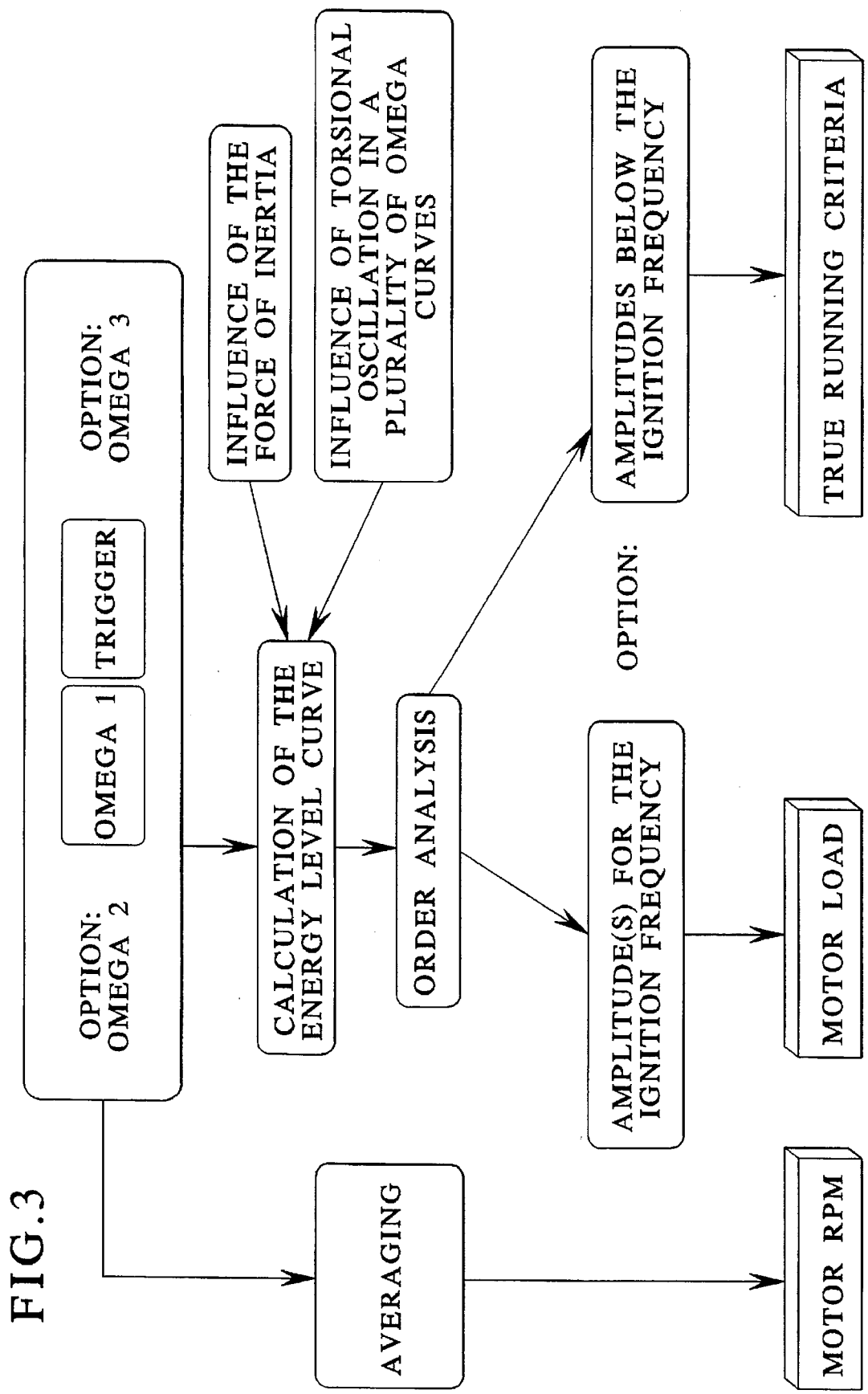
FIG. 3 is a schematic flowchart of the present invention.

FIG. 3 shows an overview of the concrete measuring method. In the first step, the measured quantity $\omega_1$ together with the appertaining trigger signal T as well as the optionally identified measured quantities $\omega_2$ and $\omega_3$ are freed of higher-frequency measuring errors as a consequence of imprecisions of $\Delta\alpha$ or, respectively, $\Delta t$. To that end, the angular velocity is preferably smoothed with a sliding averaging. It will also be expedient to calculate the $\omega$ curve independently of the plurality of marks with an angular resolution of, for example, 720/1024° crank angle, so that a plurality of reference points in a power of two is available per cycle. This can occur on the basis of an interpolation of the smoothed curve and has the advantage that the fast and simple FFT algorithms can be applied in a later step.

In the next steps, the method set forth below for calculating the energy level and its ordering spectrum can be acquired from the resultant quantity "engine load" and, optionally, resultant quantities for the uniformity of the individual cylinder loads "true running" can also be acquired.

Figure 4:
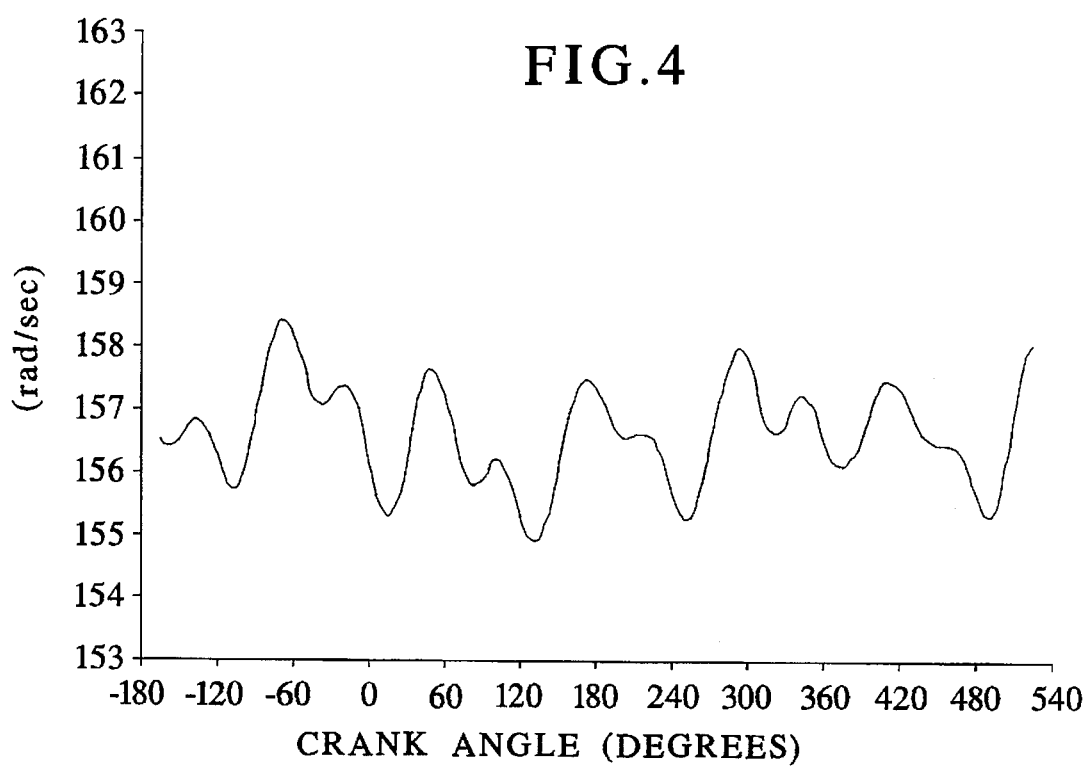
FIG. 4 is a graphic illustration of angular speed of the flywheel versus crank angle.

The resultant quantity "speed" is acquired in a known way, for example from the trigger signal T. When the crank shaft can be considered to be rigid—for example, due to its short length—, then only a measurement of angular speed ensues, preferably at the gear rim. FIG. 4 shows a typical curve of the measured quantity $\omega_1$ dependent on the crank angle.

A further measurement of angular velocity ensues at the free crank shaft end given long crank shafts. Fundamentally, but not necessarily, the precision of the method can be enhanced by the modeling of the drive train into a plurality of rigid masses and mass-free springs lying therebetween. In this case, the angular velocities of all "rigid model masses" would have to be measured (see, for example, FIG. 6), so that $\omega_1$ through $\omega_n$ curves of angular velocity that are all calculated and smoothed as a function of the main crank angle ($\alpha=\alpha_1$) derive according to equation (1) dependent on the plurality of measuring points "n".

The curve of the energy stored in the machine system is identified from the rotational angle velocity $\omega_j$ of the crank shaft measured in this way—as disclosed in Austrian Patent No. 393,324 (U.S. Pat. No. 5,157,965).

$$E_{ges}(\alpha) = I_1(\alpha) \cdot \frac{\omega_1^2(\alpha)}{2} + \sum_{j=2}^{n} I_j \frac{\omega_j^2(\alpha)}{2} + E_{pot} \qquad \text{(Equation 2)}$$

$E_{ges}(\alpha)$ ... energy stored in the machine system
$I_1(\alpha)$ ... moment of inertia for measuring point 1 into which the inertial effect of the oscillating masses was calculated:

$$I_1(\alpha) = I_{01} \cdot \left(1 + \frac{m_{0s} \cdot r^2}{I_{01}} \cdot \sum_{j=1}^{z} (x'(\alpha_j)^2)\right) \qquad \text{(Equation 3)}$$

$I_{01}$ ... moment of inertia of the rotating masses at measuring point 1
$M_{0s}$; ... total oscillating mass in a cylinder
r ... half stroke
z ... number of cylinders
$\alpha_j$ ... cylinder-associated crank angle that is zero in the ignition OT of the cylinder "j"

$$x'(\alpha) = \frac{dx}{d\alpha} = \sin\alpha \frac{\lambda \sin 2\alpha}{2\sqrt{1-\lambda^2\sin^2\alpha}} \quad \text{(Equation 4)}$$

$x(\alpha_j)$ ... dimension-less stroke of the cylinder j
$\lambda$ ... connecting rod ratio $$\left(\lambda = \frac{r}{1}\right)$$

1 ... connecting rod length
$I_j$ ... moment of inertia for measuring point j
Epot ... sum of all potential energies that are stored in the drive train system.

The calculation thereof shall not be discussed in greater detail here since it can be left out of consideration for recognizing the load.

Figure 5:
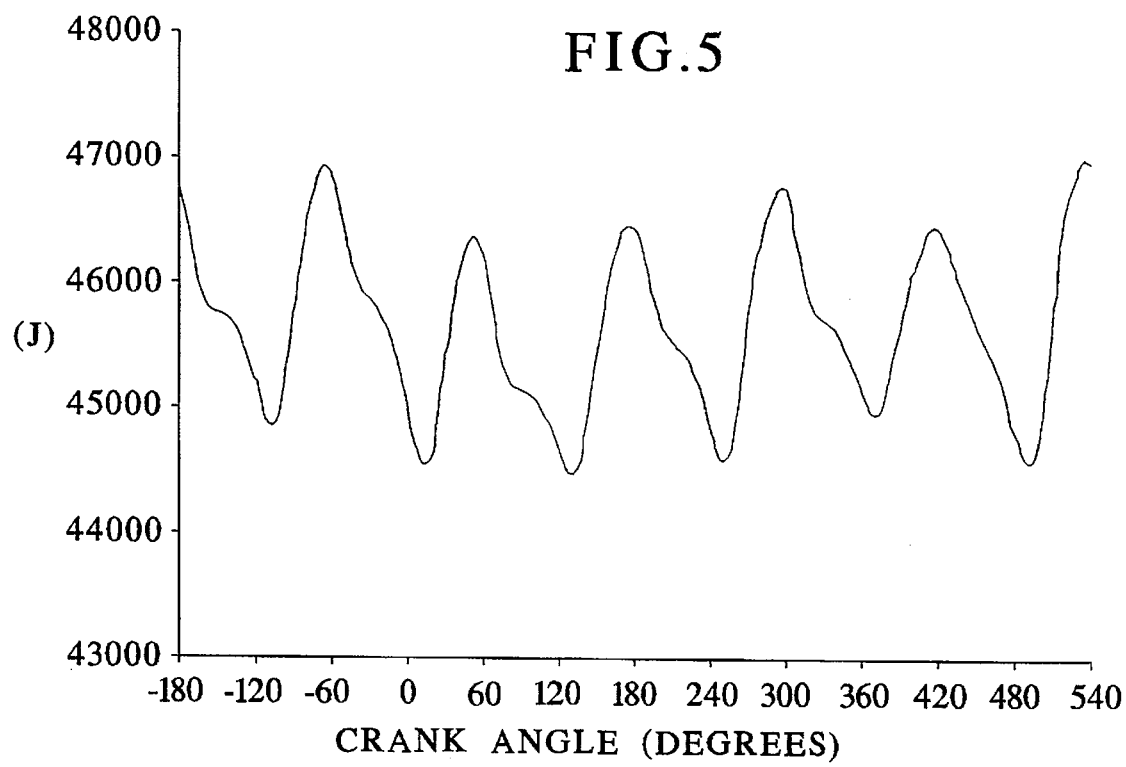
FIG. 5 is a graphic illustration of stored energy versus crank angle calculated with the measured angular velocity of the flywheel.

FIG. 5 shows the energy level curve calculated from the measured quantity $\omega_1$; and FIG. 7 shows the energy level curves obtained with enhanced precision by taking $\omega_2$ and $\omega_3$ into consideration.

It is then a critical element of this invention that the fluctuations in this curve of the stored energy, which is basically highly distinctive in the ignition frequency, represent a measure for the engine load. The explanation of this fact that is initially not obvious is as follows: given a high engine load, the individual cylinder torque exhibits higher fluctuations as a consequence of the gas forces than at low load (see FIG. 8). Due to the greater quantity of air (turbo charger), a more negative compression torque derives on the one hand. The greater quantity of fuel injected, on the other hand, yields a more positive expansion torque.

These torque fluctuations therefore also lead to more or less great irregularities in the drive train rotation. The cycle duration thereby coincides with the ignition spacing. However, the influence of the mass forces and that of the torsional oscillations in the drive train are disturbingly superimposed on the flywheel motion. It is precisely these disturbing influences that are taken into consideration with practically arbitrary precision in the calculation of the energy level curve—the torsional oscillation influences as well dependent on the plurality of $\omega$ measuring points.

One can see another element of this invention from equations (2) through (4), namely the lower plurality of engine data required for the correct acquisition of the mass force influence. Over and above this, this plurality can be reduced when the following possibility of simplification is taken into consideration: since an allocation of the ignition frequency amplitudes to the appertaining load moments is required in any case—at least at a speed, for example in no-load, the no-load amplitude relative to the torque 0 Nm or, given full load, the full load amplitude relative to the nominal torque—, it is not necessary to calculate the energy level curve as an absolute quantity. A relative calculation suffices wherein Eges is normed to $I_{01}=1$ kgm². The proportional quantities $m_{0j} \cdot r^2/I_{01}$ and $\lambda$ suffice for calculating the mass forces and the moment of inertia of the measuring point j can be replaced by the proportional expression $I_j/I_{01}$ for taking the torsional oscillations into consideration.

The average ignition frequency amplitude $A(n_z)$ that is sought can be most simply identified by an ordering analysis with the assistance of a FFT algorithm. It is thereby advantageous that an interpolation was implemented in the smoothing of the $\omega$-curves, so that the number of reference points is a power of two.

$$A(n) = \frac{2}{\sqrt{N}} \sqrt{X^2 n r^2 + X^2 n i^2} \quad \text{(Equation 5)}$$

N ... plurality of angle reference points per cycle
n ... order relative to the fundamental frequency $$\left(n = 1 \ldots \frac{N}{2}\right)$$

$$Xn = \frac{1}{\sqrt{N}} \cdot \sum_{\alpha=0}^{(N-1)} E(\alpha) \cdot e^{-i2\pi\alpha \cdot n/N}$$

Xnr ... real part of Xn
Xni ... imaginary part of Xn

Dependent on the number of cylinders z and the number of cycles t, the order $n_z$ of the ignition frequency derives as $$n_z = \frac{z \cdot 2}{t} \quad \text{(Equation 7)}$$

Given unequal ignition spacings (for example, for a V-6 cylinder engine: $a_1=150°$, $a_2=90°$), what is to be fundamentally understood as (ignition frequency amplitude) is the sum of the amplitudes for the following Crank shaft orderings:

$$n_{z1} = \frac{360}{a_1} \quad \text{(Equation 8)}$$

$$n_{z2} = \frac{360}{a_2} \quad \text{(Equation 9)}$$

and $$n_{z1-2} = \frac{360}{a_1 + a_2} \quad \text{(Equation 10)}$$

As warranted, rounding is thereby carried out to the closest crank shaft ordering.

In an individual case, an amplitude can also be omitted or can be replaced by the amplitude for the crank shaft ordering of a whole-number multiple of $n_{z1}$ or $n_{z2}$.

Figure 9:
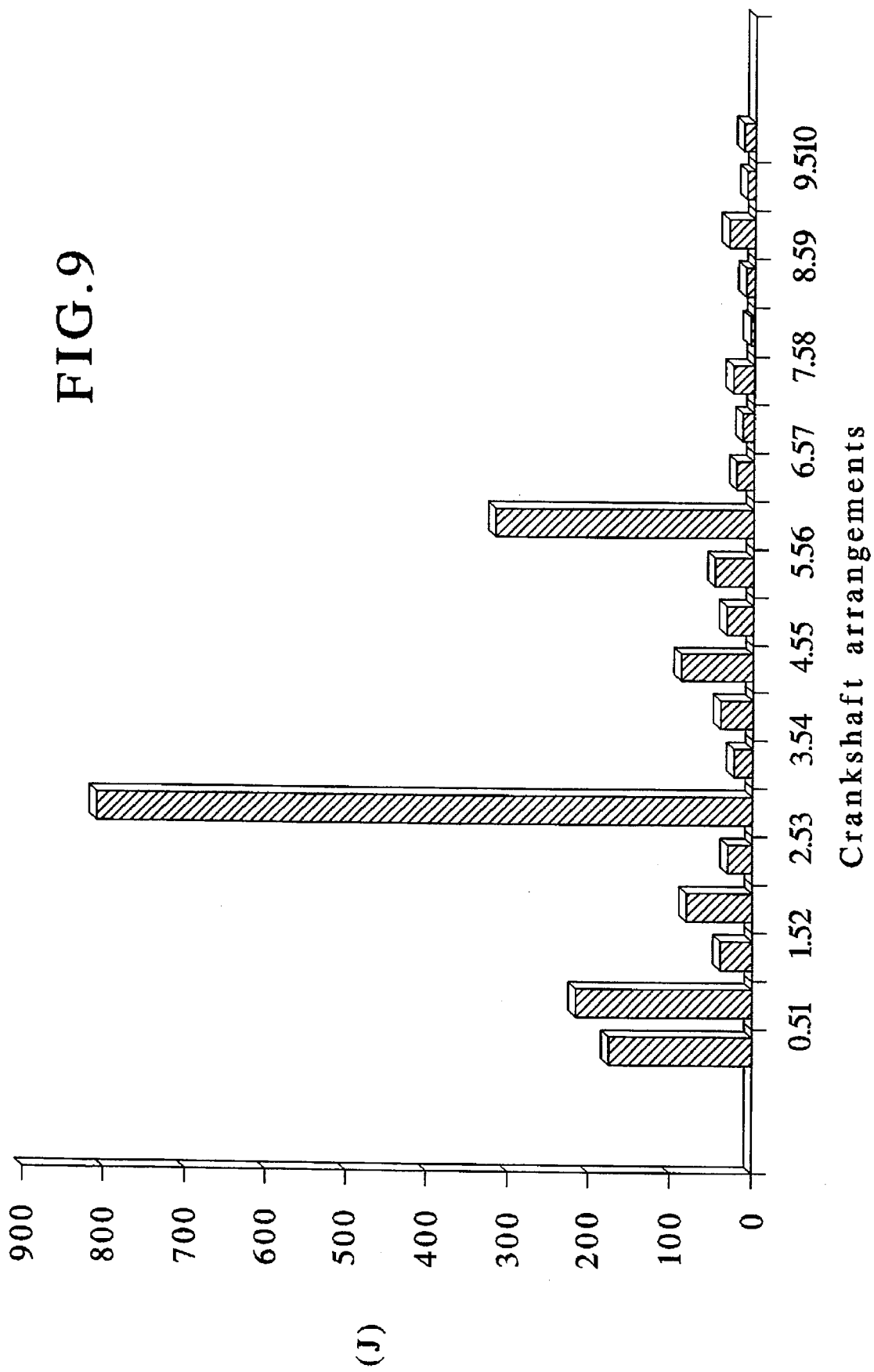
FIG. 9 is a graphic illustration of stored energy versus crank shaft arrangement.

FIG. 9 then shows an example of such an ordering analysis of an energy level curve for a 6-cylinder in-line engine.

Figure 10:
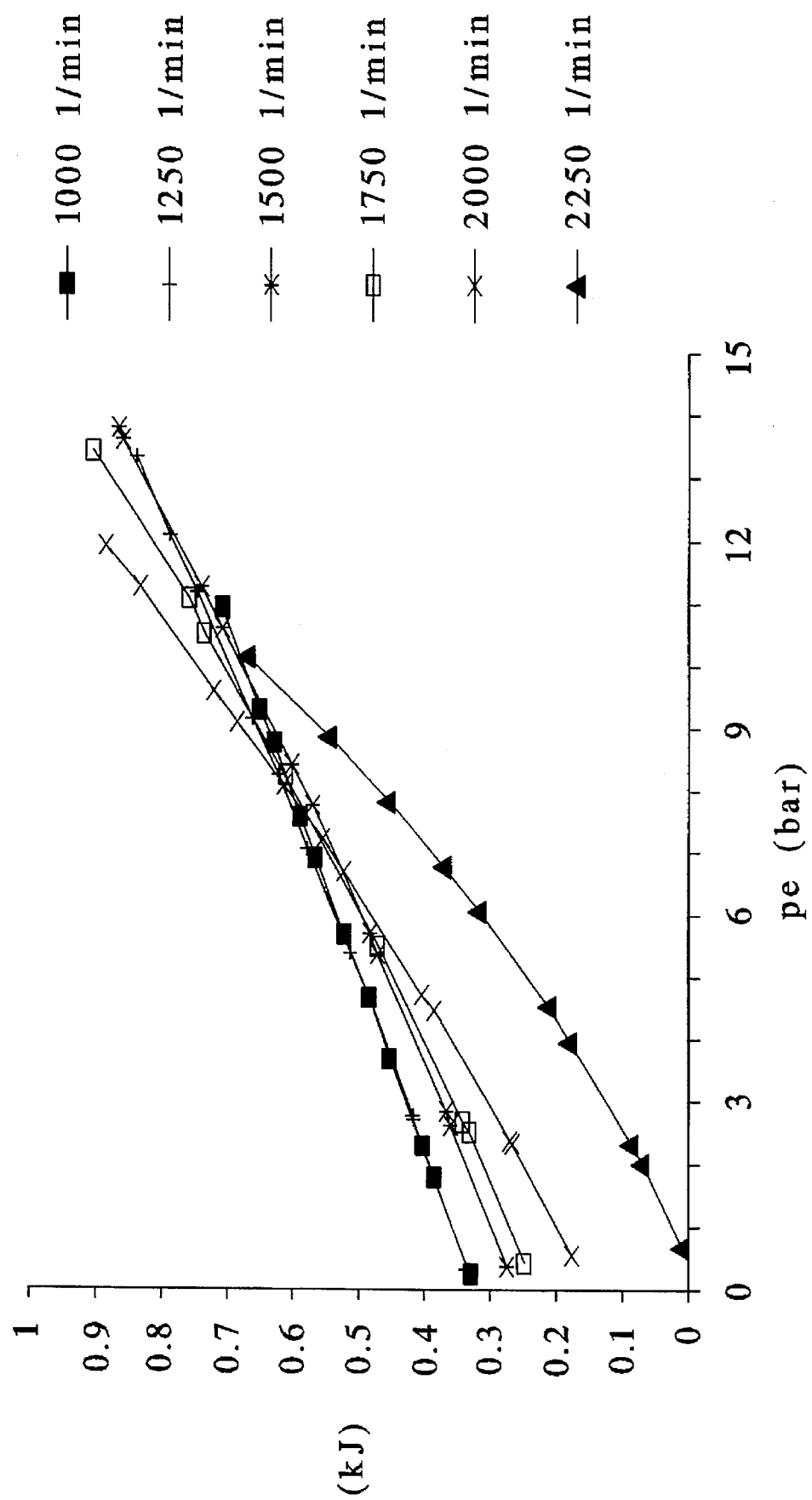
FIG. 10 is a graphic illustration of ignition frequency amplitudes versus pressure based upon the angular velocity of the flywheel.
Figure 11:
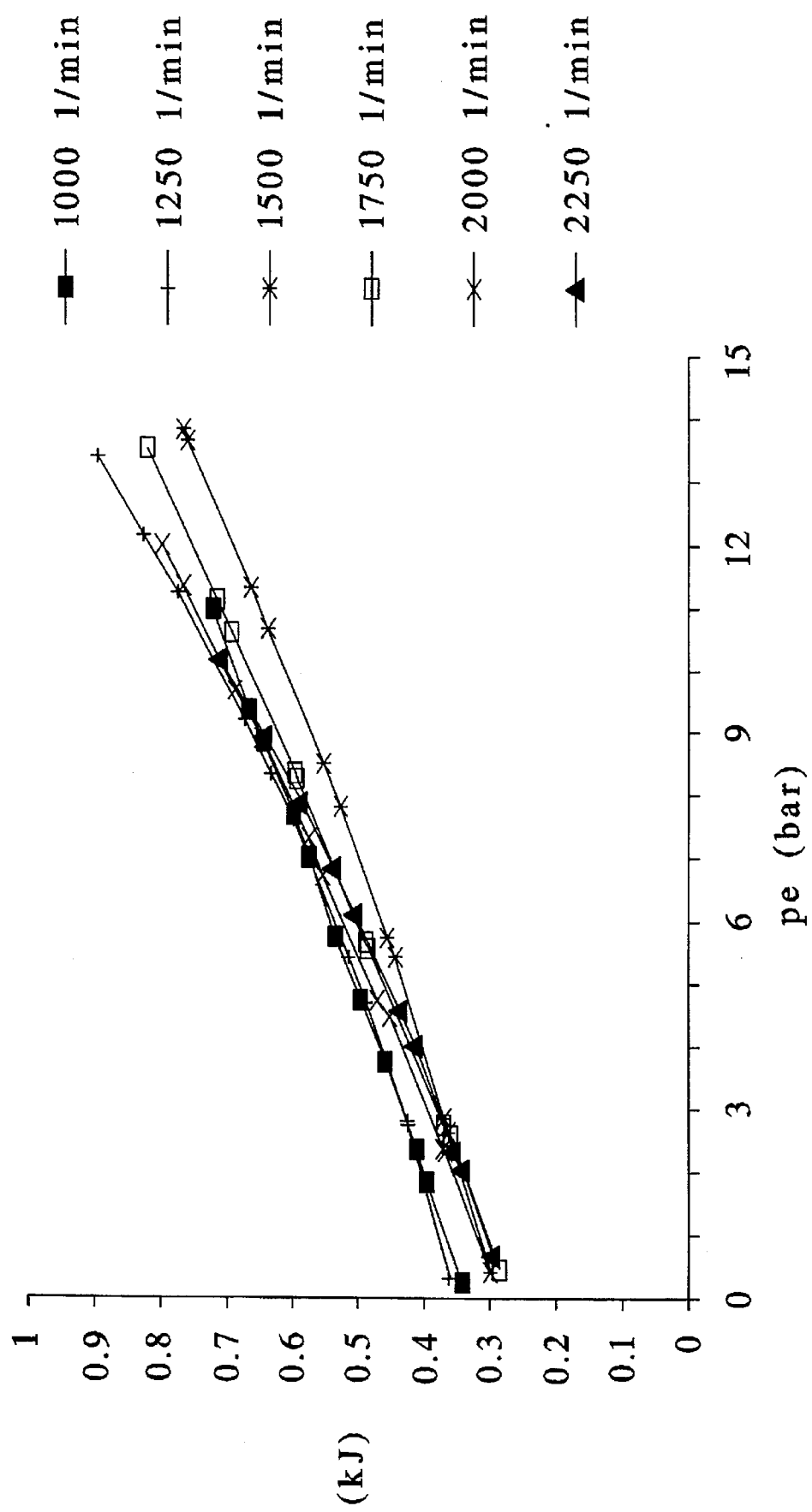
FIG. 11 is a graphic illustration of ignition frequency amplitudes versus pressure based upon two angular velocities.

FIGS. 10 and 11 show the dependencies of the amplitude for the ignition frequency (for example, for the third crank shaft ordering for the 6-cylinder engine, see FIG. 9) on the load that is measured independently thereof. One can see that monotonously rising curves derive for all speeds, namely already when only the mass force influence is compensated in the measurement of a single $\omega$-curve (FIG. 10).

When a significant part of the torsional oscillations are likewise compensated by a second angular velocity measurement, for example at the free crank shaft end, then, as anticipated, a single, nearly linear relationship that is practically independent of the speed derives between the engine load and the ignition frequency amplitude of the energy level curve (FIG. 11).

One can see that the amplitude for the ignition frequency already represents a measure for the load given measurement of only one angular velocity curve. By measuring additional angular velocity curves, the curve of the energy stored in the machine train can be more exactly acquired and, thus, the fundamentally speed-independent relationship to the load can be approximated better.

This relationship can also be calibrated for load at one engine per engine type. The current engine load moment can then be specified as an absolute quantity with reference to the measured fluctuations in energy level.

The calibration ensues on a testing stand at which a load reference measurement is possible. It is possible given a known engine moment of inertia ($I_0$) but is likewise possible in a few free accelerations of an engine built into the vehicle at the factory.

As known, the effective engine torque (M) can also be defined as $$M = I_0 \cdot \langle \omega \rangle \qquad \text{(Equation 11)}$$

What is thereby understood by $\langle \omega \rangle$ is the measurable, average speed acceleration during, for example, an operating cycle and what is to be understood by $I_0$ is the overall effective moment of inertia.

According to the invention presented here, this engine torque (M) identified in this way, however, can also be identified from the simultaneously calculable ignition frequency amplitude of the energy level curve.

$$M = d + k \cdot A(n_z) \qquad \text{(Equation 12)}$$

When equation 11 and equation 12 are equated at at least two load points, for example for an operating cycle from a full-load acceleration and in a further operating cycle of approximately the same speed from a partial load acceleration, then the calibration factors d and k can be calculated for this engine type (at this speed).

Given the application of the FFT for the calculation of $A(n_z)$, it is beneficial when the non-periodic part of all measured $\omega$-curves caused by $\langle \omega \rangle$ that are utilized for calculating the energy level is previously removed:

$$\omega_{corr(\alpha)} = \omega_{(\alpha)} - [\omega_{(\alpha 1)} - \omega_{(\alpha 0)}] \frac{\alpha - \alpha_0}{\alpha_1 - \alpha_0} \qquad \text{(Equation 13)}$$

Thereby denoting are:
$\omega_{corr}$ ... corrected $\omega$-curve without acceleration part
$\omega_{(\alpha)}$ ... $\omega$-curve with acceleration part
$\alpha$ ... current crank angle
$\alpha_0$ through $\alpha_1$ ... averaging range, meaningfully one operating cycle In addition, a general statement about the uniformity of the individual cylinder outputs can be acquired from the ordering spectrum of the energy level curve (see FIG. 3). When the engine runs "untrue", then all amplitudes for crank shaft orderings below the ignition frequency are allocated, in a four-cycle engine preferably below through including half the ignition frequency (thus, for example, $0.5^{th}$, $1^{st}$ and $1.5^{st}$ crank shaft ordering for the 6-cylinder engine, see FIG. 9).

Fundamentally, the sum of these amplitudes can therefore be utilized as a measure for uniformity or, respectively, true running.

It is particularly the $0.5^{th}$ crank shaft ordering that is excited at the minimum performance of a cylinder of a four-cycle engine (the first crank shaft ordering given a two-cycle engine).

It can therefore also be utilized only as an error recognition measure.

The limit values between go and no go status can vary with load and speed and are automatically set in a "self-learning phase" upon installation of the apparatus at the "go engine structure" with reference to statistical methods (see FIG. 2).

The measurement of the speed and of the rotational uniformity is thus suitable for acquiring diagnostic statements about the engine condition. The effective moment of inertia of the engine thereby also required under certain circumstances, however, is frequently not known.

The measurement of the speed and/or of the rotational uniformity not only without but also with a small additional load is therefore also proposed. This additional load can be an additional, known moment of inertia and/or an additional, known moment of friction. The unknown moment of inertia of the engine can be calculated on the basis of a computational comparison of the measured results with and without additional load.

The curve $\omega_1$ of the speed and the rotational uniformity are thereby measured, first, without additional load and the evaluation is made with the parameters $I_1$ ... moment of inertia of the rotating masses
$M_1$ ... effective average moment
and, on the other hand, the curve $\omega_2$ is measured with additional load under conditions that are otherwise the same and this is evaluated with
$I_2 = I_1 + I_B$ ... moment of inertia including additional load
$M_2 = M_1 - M_B$ ... effective moment given additional load A conditional equation for $I_1$ is thus obtained.

The average speed change $\langle \omega \rangle$ identified in free acceleration and/or run-down can be placed in relationship to the effective moment according to Newton's law:

$M_1 = I_1 \cdot \langle \omega_1 \rangle$
$M_2 = I_2 \cdot \langle \omega_2 \rangle$ The moment of inertia $I_1$ that is sought is thus obtained:

$$I_1 = (M_B + I_B \cdot \langle \omega_2 \rangle) / (\langle \omega_1 \rangle - \langle \omega_2 \rangle) \qquad \text{(Equation 14)}$$

The loading means, for example, can thereby be designed such that it can be mounted instead of the standardized tool for manual rotation of the flywheel. Like this tool, it should thus contain a pinion that engages into the gear rim of the flywheel and is driven by it. The pinion in turn drives the loading means that, for example, can be composed of a flywheel and/or of a hydraulic brake. Advantageously, a clutch for optional activation of the additional load can also be provided.

Another possibility of realizing the additional load makes use of the existing generator (electric generator, alternator) to which an electrical load resistor can be optionally connected. What may thereby be disadvantageous under certain circumstances, however, are the relatively low power of the generator, which dare not be overloaded, as well as its efficiency dependent on speed and load.

In the normal case, the mechanical solution is therefore to be preferred for said reasons.

The gear rim sensor for measuring the speed and the rotational uniformity could also be built into the load means.

We claim:

1. A method for testing an internal combustion engine, whereby measurements of a rotation angle velocity that is dependent on a crank angle are continuously implemented and dimensional quantities for speed and torque are identified on a basis of an evaluation thereof, wherein an average oscillation amplitude corresponding to the ignition frequency of a total energy level is used as a dimensional quantity for torque, the total energy level is calculated from a momentary rotational angle velocity and from a momentary moment of inertia which are dependent on the crank angle and take into account a kinetic energy of oscillating masses of said engine.

2. The method of claim 1 wherein the average oscillation amplitude is identified on the basis of an ordering analysis with an FFT algorithm.

3. A method according to claim 1, wherein said curve of the rotational angle velocity is first conditioned by a signal editing and then evaluated.

4. A method according to claim 1, wherein said curve of the quantities derived from the rotational angle velocity is first conditioned by a signal editing and then evaluated.

5. A method according to claim 3, wherein said editing comprises an averaging by superimposing curves from a plurality of operating cycles.

6. A method according to claim 3, wherein said editing comprises an average by superimposing curves from a plurality of ignition periods.

7. A method according to claim 3, wherein said editing comprises a smoothing averaging.

8. A method according to claim 3, wherein the curve of the rotational angle velocity is calculated with a defined angular resolution so that a plurality of reference points in a power of two is available per cycle.

9. A method for testing internal combustion engines, whereby measurements of the rotation angle velocity that is dependent on the crank angle are continuously implemented and dimensional quantities for speed and torque are identified on the basis of the evaluation thereof, wherein an average fluctuation amplitude in an energy level curve that is calculated from a curve of the rotational angle velocity at an ignition frequency is utilized as a dimensional quantity for torque, and wherein the average fluctuation amplitude of the energy level curve at the ignition frequency is identified on the basis of an ordering analysis with an FFT algorithm.

10. A method according to claim 9, wherein amplitude elevations for crank shaft orderings versus the ignition frequency are calculated from an ordering spectrum of the energy level curve and are employed as a measure for uniformity of individual cylinder outputs.

11. A method according to claim 10, wherein the amplitude elevations for crank shaft ordering versus the ignition frequency are calculated from the ordering spectrum of the energy level curve and are employed as a measure for a true running of the internal combustion engine.

12. A method according to claim 1, wherein, for calculating the total energy level curve, the curve of the rotational angle velocity of a respective internal combustion engine that is dependent on the crank angle is calculated once without and once with additional load on a basis of an additional, known moment of inertia, wherefrom a effective moment of inertia is calculated by comparing respective measured results.

13. A method according to claim 11, wherein, for calculating the total energy level curve, the curve of the rotational angle velocity of the respective internal combustion engine that is dependent on the crank angle is calculated once without and once with additional load on a basis of an additional, known moment of friction.

14. A method according to claim 13, wherein said additional moment of friction is generated via an electrical load resistor connected into a generator present at the interval combustion engine.

15. A method according to claim 12, wherein the additional load is produced by an additional fly wheel driven by the internal combustion engine.

16. A method according to claim 13, wherein the additional load is produced by a braking means.

17. An apparatus for testing internal combustion engines, comprising a measuring means for identifying a rotational angle speed that is dependent on crank angle and comprising an evaluation unit in communication therewith for calculating quantities for speed and torque, wherein the evaluation unit comprises a means for calculating an average oscillation amplitude corresponding to the ignition frequency of a total energy level, and a means for calculating a total energy level from a momentary rotational angle velocity and from a momentary moment of inertia which are dependent on the crank angle and which take into account a kinetic energy of oscillating masses of said engine, the evaluation unit using the average oscillation amplitude as a dimensional quantity for torque.

18. The apparatus of claim 17 wherein the evaluation unit identifies the average oscillation amplitude on the basis of an ordering analysis with an FFT algorithm.

19. An apparatus according to claim 17, wherein the evaluation unit is preceded by a signal editing unit.

20. An apparatus according to claim 17, wherein a fly wheel having a known moment of inertia is provided to be additionally driven by the internal combustion engine.

21. An apparatus according to claim 17, wherein a braking means representing a defined load is provided for engaging an output shaft of the internal combustion engine.

22. An apparatus according to claim 17, wherein a generator is connected to an output shaft of said internal combustion engine, which generator has a defined electrical load resistor connected to it.

23. A method for testing an internal combustion engine, comprising the steps:

continuously measuring a rotation angle velocity that is dependent on a crank angle;

calculating a total energy level that is calculated from a momentary rotational angle velocity and from a momentary moment of inertia, which are dependent on the crank angle and take into account a kinetic energy of oscillating masses of said engine;

determining an average oscillation amplitude corresponding to the ignition frequency in said total energy level; and utilizing said average oscillation amplitude as a quantity for torque.

24. The method of claim 23 wherein the average oscillation amplitude is identified on the basis of an ordering analysis with an FFT algorithm.

* * * * *